United States Patent
Skidmore et al.

(10) Patent No.: US 6,876,951 B2
(45) Date of Patent: *Apr. 5, 2005

(54) METHOD FOR CREATING A COMPUTER MODEL AND MEASUREMENT DATABASE OF A WIRELESS COMMUNICATION NETWORK

(75) Inventors: Roger R. Skidmore, Blacksburg, VA (US); Theodore S. Rappaport, Blacksburg, VA (US)

(73) Assignee: Wireless Valley Communications, Inc., Austin, TX (US)

( * ) Notice: Subject to any disclaimer, the term of this patent is extended or adjusted under 35 U.S.C. 154(b) by 27 days.

This patent is subject to a terminal disclaimer.

(21) Appl. No.: 10/127,573

(22) Filed: Apr. 23, 2002

(65) Prior Publication Data

US 2002/0111772 A1 Aug. 15, 2002

Related U.S. Application Data

(63) Continuation of application No. 09/221,985, filed on Dec. 29, 1998, now Pat. No. 6,442,507.

(51) Int. Cl.[7] ............................ G06F 11/30; G06F 15/00
(52) U.S. Cl. ...................................................... 702/186
(58) Field of Search ................................ 702/186, 150, 702/152, 153, 182; 455/446, 456.1

(56) References Cited

U.S. PATENT DOCUMENTS

| | | |
|---|---|---|
| 4,675,147 A | 6/1987 | Schaefer et al. |
| 4,736,453 A | 4/1988 | Schloemer |
| 4,885,694 A | 12/1989 | Pray et al. |
| 5,111,392 A | 5/1992 | Malin |
| 5,119,307 A | 6/1992 | Blaha et al. |
| 5,239,487 A | 8/1993 | Horejsi et al. |

(Continued)

OTHER PUBLICATIONS

Kobleus et al., Mar. 1, 1998, Optimizing In–Building Coverage pp. 1–4.*

Meyers, Jason, Jan. 26, 1998, From the inside out: Vewndor guides carriers toward indoor coverage.*

Safco Technologies Inc. CDMA Walkabout Operators Manualpp. 97,99.*

Software by Andrew titled "RF Planner" dated Jun. 17, 1997.

Auser guide titled "Andrew Microwave System Planner" dated 7–99.

A user guide titled "Andrew Antenna System Planner" dated 6–99.

(Continued)

*Primary Examiner*—John Barlow
*Assistant Examiner*—Demetrius Pretlow
(74) *Attorney, Agent, or Firm*—Whitham, Curtis & Christofferson, P.C.

(57) ABSTRACT

A system for creating a computer database model of either measured data network throughput properties or wireless communication signal properties within a facility by measuring the desired properties at a plurality of locations within the facility and embedding the measured properties at the location of measurement represented in a three-dimensional facility drawing database.

299 Claims, 6 Drawing Sheets

U.S. PATENT DOCUMENTS

| | | |
|---|---|---|
| 5,293,640 A | 3/1994 | Gunmar et al. |
| 5,307,261 A | 4/1994 | Maki et al. |
| 5,337,149 A | 8/1994 | Kozah et al. |
| 5,339,184 A | 8/1994 | Tang |
| 5,375,123 A | 12/1994 | Andersson et al. |
| 5,394,522 A | 2/1995 | Sanchez-Frank et al. |
| 5,450,615 A | 9/1995 | Fortune et al. |
| 5,458,123 A | 10/1995 | Unger |
| 5,465,390 A | 11/1995 | Cohen |
| 5,467,441 A | 11/1995 | Stone et al. |
| 5,482,050 A | 1/1996 | Smokoff et al. |
| 5,485,568 A | 1/1996 | Venable et al. |
| 5,491,644 A | 2/1996 | Pickering et al. |
| 5,491,837 A | 2/1996 | Haartsen |
| 5,493,679 A | 2/1996 | Virgil et al. |
| 5,515,269 A | 5/1996 | Willis et al. |
| 5,528,518 A | 6/1996 | Bradshaw et al. |
| 5,539,665 A | 7/1996 | Lamming et al. |
| 5,553,312 A | 9/1996 | Gattey et al. |
| 5,553,620 A | 9/1996 | Snider et al. |
| 5,555,354 A | 9/1996 | Strasnick et al. |
| 5,561,841 A | 10/1996 | Markus |
| 5,564,070 A | 10/1996 | Want et al. |
| 5,586,254 A | 12/1996 | Kondo |
| 5,594,946 A | 1/1997 | Menich et al. |
| 5,598,532 A | 1/1997 | Liron |
| 5,625,827 A | 4/1997 | Krause et al. |
| 5,636,344 A | 6/1997 | Lewis |
| 5,689,355 A | 11/1997 | Okubo et al. |
| 5,710,758 A | 1/1998 | Soliman et al. |
| 5,755,072 A | 5/1998 | Lingafelter |
| 5,761,093 A | 6/1998 | Urbish et al. |
| 5,774,669 A | 6/1998 | George et al. |
| 5,794,128 A | 8/1998 | Brockel et al. |
| 5,799,154 A | 8/1998 | Kuriyan |
| 5,802,146 A | 9/1998 | Dulman |
| 5,809,282 A | 9/1998 | Cooper et al. |
| 5,815,395 A | 9/1998 | Hart et al. |
| 5,821,937 A | 10/1998 | Tonelli et al. |
| 5,825,759 A | 10/1998 | Liu |
| 5,828,960 A | 10/1998 | Tang et al. |
| 5,831,610 A | 11/1998 | Tonelli et al. |
| 5,832,389 A | 11/1998 | Dent |
| 5,845,124 A | 12/1998 | Berman |
| 5,861,887 A | 1/1999 | Butler et al. |
| 5,867,112 A | 2/1999 | Kost |
| 5,877,777 A | 3/1999 | Colwell |
| 5,878,328 A | 3/1999 | Chawla et al. |
| 5,907,850 A | 5/1999 | Krause et al. |
| 5,917,808 A | 6/1999 | Kosbab |
| 5,923,850 A | 7/1999 | Barroux |
| 5,926,762 A | 7/1999 | Arpee et al. |
| 5,940,196 A | 8/1999 | Piehler et al. |
| 5,945,976 A | 8/1999 | Iwamura et al. |
| 5,948,055 A | 9/1999 | Pulsipher et al. |
| 5,949,335 A | 9/1999 | Maynard |
| 5,949,988 A | 9/1999 | Feisullin et al. |
| 5,953,669 A | 9/1999 | Stratis et al. |
| 5,963,867 A | 10/1999 | Reynolds et al. |
| 5,970,406 A | 10/1999 | Komara |
| 5,977,851 A | 11/1999 | Stancil et al. |
| 5,987,328 A | 11/1999 | Ephremides et al. |
| 5,994,984 A | 11/1999 | Stancil et al. |
| 6,006,021 A | 12/1999 | Tognazzini |
| 6,018,625 A | 1/2000 | Hayball et al. |
| 6,021,316 A | 2/2000 | Heiska et al. |
| 6,032,105 A | 2/2000 | Lee et al. |
| 6,038,547 A | 3/2000 | Casto |
| 6,044,273 A | 3/2000 | Tekinay |
| 6,058,102 A | 5/2000 | Drysdale et al. |
| 6,058,262 A | 5/2000 | Kawas et al. |
| 6,059,842 A | 5/2000 | Dumarot et al. |
| 6,061,722 A | 5/2000 | Lipa et al. |
| 6,075,541 A | 6/2000 | Maclinovsky |
| 6,085,335 A | 7/2000 | Djoko et al. |
| 6,088,522 A | 7/2000 | Lee et al. |
| 6,104,699 A | 8/2000 | Holender et al. |
| 6,108,309 A | 8/2000 | Cohoe et al. |
| 6,111,857 A | 8/2000 | Soliman et al. |
| 6,122,083 A | 9/2000 | Ohta et al. |
| 6,148,010 A | 11/2000 | Sutton et al. |
| 6,199,032 B1 | 3/2001 | Anderson |
| 6,204,813 B1 | 3/2001 | Wadell et al. |
| 6,208,833 B1 | 3/2001 | Preschutti et al. |
| 6,229,540 B1 | 5/2001 | Tonelli et al. |
| 6,243,772 B1 | 6/2001 | Ghori et al. |
| 6,253,086 B1 | 6/2001 | Parantainen et al. |
| 6,285,377 B1 | 9/2001 | Greenbaum et al. |
| 6,289,203 B1 | 9/2001 | Smith et al. |
| 6,311,144 B1 | 10/2001 | Abu El Ata |
| 6,317,599 B1 | 11/2001 | Rappaport et al. |
| 6,326,987 B2 | 12/2001 | Alexander |
| 6,330,005 B1 | 12/2001 | Tonelli et al. |
| 6,337,688 B1 | 1/2002 | Berstis |
| 6,338,031 B1 | 1/2002 | Lee et al. |
| 6,356,758 B1 | 3/2002 | Almeida et al. |
| 6,393,432 B1 | 5/2002 | Flansburg et al. |
| 6,408,312 B1 | 6/2002 | Forthman et al. |
| 6,442,507 B1 | 8/2002 | Skidmore et al. |
| 6,470,195 B1 | 10/2002 | Meyer |
| 6,487,417 B1 | 11/2002 | Rossoni et al. |
| 6,493,679 B1 | 12/2002 | Rappaport et al. |
| 6,496,290 B1 | 12/2002 | Lee |
| 6,499,006 B1 | 12/2002 | Rappaport et al. |
| 6,505,045 B1 | 1/2003 | Hills et al. |
| 2003/0055604 A1 * | 3/2003 | Skidmore et al. ........... 702/186 |

OTHER PUBLICATIONS

Article "Building Database Manipulator" Copyright, Jan. 1998; MPRG and Virginia Tech.

PCS 97 Track 7; Engineering & Systems Management; T. Rappaport.

Propagator; vol. 8, No. 3; Fall 1997.

SMT Plus 1.0 User's Manual; R. Skidmore & T. Rappaport; Copyright, Aug. 1996 Virginia Tech.

Joseph R. Loring & Associates, Roger Skidmore et al.; Russell Senate Office Propigation Study—Project Update; Jan. 19, 1997.

T. S. Rappaport; Indoor Path Loss Measurements for Homes and Apartments at 2.4 and 5.58 GHz; Dec. 16, 1997.

Product Description TEMS Light, Ericsson, Sep. 9, 1996.

Walk about PCS—Portable Coverage Survey System; SAFCO.

LLC International, Inc.; Pen–Based Collection and Analysis Tool; PenCat; Http://www.lccinc.com/prodserv/PROD-UCTS/pencat.html.

Jorgen Anderson et al.; Propagation Measurements and Models for Wireless Communications Channels; IEEE Communications Magazine; Jan., 1995; pp. 42–49.

Roger R. Skidmore et al.; Interactive Coverage and System Design Simulation for Wireless Communication Systems in Multifloored Indoor Environments: SMT Plus; IEEE ICUPC'96; Sep. 29–Oct. 2, 1996; pp. 646–650.

Scott Y Siedel et al.; The Impact of Surrounding Buildings on Propagation for Wireless In–Building Personal Communications System Design.

From Bird's Eye Real–time Mapping Software dated Jun. 30, 2002.

IEEE Transactions on Antennas and propagation, vol. 46, No. 8, Aug. 1998. "Effect of Terrrain on Path Loss in Urban Environments for Wireless Applications" Leonard Piazzi and Henry L. Bertoni.

P. Bahl, V. Padmanabhan, and A. Balachandran, "A Software System for Locating Mobile Users: Design, Evaluation, and Lessons," Microsoft Technical Report, Apr. 2000.

G. Durgin, T.S. Rappaport, H. Xu, Measurements and Models for Radio Path Loss and Penetration Loss in and Around Homes and Trees at 5.85 GHz, IEEE Transactions on Communications, vol. 46, No. 11, Nov. 1998.

C.M. Peter Ho et al., "Antenna Effects on Indoor Obstructed Wireless Channels and a Deterministic Image–Based Wide–Band Propagation Model for In–Building Personal Communications Systems," International Journal of Wireless Information Networks, vol. 1, No. 1, 1994.

S. Kim et al., "Radio Propagation Measurements and Predictions Using Three–dimensional Ray Tracing in Urban Environments at 908 MHZ and 1.9 GHz," IEEE Transactions on Vehicular Technology, vol. 48, No. 3, May 1999.

T.S., Rappaport et al., "Use of Topographic Maps with Building Information to Determine Antenna Placements and GPS Satellite Coverage for Radio Detection and Tracking in Urban Environments," MPRG Technical Report MPRG–TR–95–14, Virginia Tech, Sep. 1995.

R. K. Morrow, Jr. and T.S. Rappaport, "Getting In," Wireless Review Magazine, Mar. 2000.

Wireless Valley Communications, Inc., "Site Planner 3.16 for Windows 95/98/NT User's Manual," Software User's Manual, pp. 5–148 to 5–156, 1999.

M. Panjwani et al., "Interactive Computation of Coverage Regions for Wireless Communication in Multifloored Indoor Environments," IEEE Journal on Selected Areas in Communications, vol. 14, No. 3, Apr. 1996.

L. Piazzi and H.L. Bertoni, "Achievable Accuracy of Site–Specific Path–Loss Predictions in Residential Enviroments" IEEE Transactions on Vehicular Technology, vol. 48, No. 3, May 1999.

T.S, Rappaport et al., "Wireless Communications: Past Events and a Future Perspective", IEEE Communications Magazine, May 2002.

T.S. Rappaport et al., "Radio Propagation Prediction Techniques and Computer–Aided Channeling Modeling for Embedded Wireless Microsystems," ARPA Annual Report, MPRG Technical Report MPRG–TR–94–12, Virginia Tech, Jul. 1994.

T.S., Rappaport et al., "Use of Topographic Maps with Building Information to Determine Antenna Placements for Radio Detection and Tracking in Urban Environments," MPRG Technical Report MPRG–TR–95–14, Virginia Tech, Nov. 1995.

D. Ullmo et al., "Wireless Propagation in Buildings: A Statistical Scattering Approach," IEEE Transactions on Vehicular Technology, vol. 48, No. 3, May 1999.

T.S. Rappaport, "wireless Communications: Principles and Practice" Second Edition, Prentice Hall, 2002.

T.S. Rappaport et al., "Use of Topographic Maps with Building Information to Determine Antenna Placements and GPS Satellite Coverage for Radio Detection and Tracking in Urban Environments," MPRG Technical Report MPRG–TR–95–14, Virginia Tech, Sep. 1995.

T.S. Rappaport et al., "Indoor Path Loss Measurement for Homes and Apartments at 2.4 and 5.85 GHz," private report produced for Motorola, Dec. 16, 1997.

T.S. Rappaport, "Isolating Interference," Wireless Review Magazine, May 2000.

Slides from T.S. Rappaport and R. Skidmore, "Introduction to In–Building Wireless Systems," Infocast In–Building Wireless Solutions Conference and Exposition, Feb. 4, 2003.

S. Sandhu, M.P. Koushik,and T.S. Rappaport "Predicted Path Loss for Roslyn VA,First set of predictions for ORD Project on Site Specific Propagation Prediction," MPRG Technical Report MPRG–TR–94–20, Virginia Tech. Dec. 1995.

S. Sandhu, M.P. Koushik, and T.S. Rappaport, "Predicted Path Loss for Roslyn VA,First set of predictions for ORD Project on Site Specific Propagation Prediction." MPRG Technical Report MPRG–TR–94–20, Virginia Tech, Mar. 1995.

S. Seidel et al., "Site–Specific Propagation Prediction for Wireless In–Building Personal Communication Design," IEEE Transactions on Vehicular Technology, vol. 43, No. 4, Nov. 1994.

S. Shakkotai and T.S. Rappaport, "Research Challenges in Wireless Networks: A Technical Overview," Proceeding of the Fifth International Symposium on Wireles Personal Multimedia Communications, Honolulu, HI, Oct. 2002.

H. Sherali et al., "On the Optimal Location of Transmitters for Micro–cellular Radio Communication System Design," IEEE Journal on Selected Areas in Communications, vol. vol. 14, No. 3, pp. 662–673, May 1996.

R, Skidmorre et al., "A Comprehensive In–Building and Microcellular Wireless Communications System Design Tool" The Bradley Department of Electrical Engineering, MPRG–TR–97–13, Jun. 1997. Master's Thesis—unpublished by Virginia Tech for 2 years after submission.

R. Skidmore, et al., Russell Senate Office Building Propagation Study, Project Report for Joseph R. Loring & Associates; "Project Update," AoC Contract #Acbr96088, prepared for Office of the Architect of the Capital, Jan. 19, 1997.

R. Skidmore, et al., Russell Senate Office Building Propagation Study, Project Report for Joseph R. Loring & Associates; "Assessment and Study of the Proposed Enhancements of the Wireless Communications Environment of the Russell Senate Office Building (RSOB) and Associated Utility Tunnels," AoC Contract #Acbr96088, prepared for the Office of the Architect of the Capitol, Feb. 20, 1997.

R. Torres et al., "CINDOOR: An Engineering Tool for Planning and Design of Wireless Systems in Enclosed Spaces," IEEE Antennas and Propagation Magazine, vol. 41, No. 4 Aug. 1999.

R. Skidmore et al., "Interactive Coverage Region and System Design Simulation for Wireless Communication Systems in Multi–Floored Environments: SMT Plus tm," IEEE ICUPC Proceedings, 1996.

T.S. Rappaport et al., "Radio Propagation Prediction Techniques and Computer–Aided CHannel Modeling for Embedded Wireless Microsystems," MPRG Tech. Report MPRG–TR–95–08, Virginia Tech, Jul. 1995.

Company Web Page "Actix" www.actix.com product name: E–NOS (now E–AMS).

Company Web Page Agilent www.agilent.com product name: OPAS32.

Company Web Page "Agilent" www.agilent.com product name: Wizard.

Company Web Page "Comarco" www.edx.com product name: SignalPro.

Company Web Page "CompOpt" www.comopt.com. product name: CellOpt AFP.

Company Web Page "Lucent" www.bell.labs.com product name: WISE.

Company Web Page "Ericsson" www.ericsson.com product name: TEMS Lite.

Company Web Page "Ericsson" www.ericsson.com product name: TEMS.

Company Web Page "Marconi" www.marconi.com product name: PlaNET.

Company Web Page "Marconi" www.marconi.com product name: decibelPlanner.

Company Web Page "Schema" www.schema.com product name: Optimizer.

Company Web Page "ScoreBoard" www.scoreboard.com product name: ScoreBoard.

* cited by examiner

METHOD FOR CREATING A COMPUTER MODEL AND MEASUREMENT DATABASE OF A WIRELESS COMMUNICATION NETWORK

CROSS-REFERENCE TO RELATED APPLICATIONS

The above-identified application is a continuation of U.S. Ser. No. 09/221,985, filed Dec. 29, 1998, now U.S. Pat. No. 6,442,507, and the complete contents of that application is herein incorporated by reference.

BACKGROUND OF THE INVENTION

1. Field of the Invention

The invention generally relates to an indoor mobile wireless communication data measurement system and more particularly to an indoor signal property measuring device that utilizes a mobile personal computer connected to a receiver for measuring location specific wireless communication system signal properties and data network throughput properties within a facility and embedding the measured properties at the measurement location within a three-dimensional drawing of the facility stored in the computer.

2. Description of the Related Art

In recent years the use of wireless communication technology, such as cellular phone networks, has greatly increased. Moreover, it has become common to implement wireless communication systems within buildings or large facilities comprising several buildings. Examples of typical wireless communication systems are local area networks (LAN), wide area networks (WAN), or cellular phone networks such as PBX, or local loops. Due to the increasingly diverse applications of wireless communication systems, system designs have become increasingly complicated and difficult to implement.

Common to all wireless communication system designs, regardless of technology, size or scale, is the need for measurement data at some point in the design process. Whether in the initial design stage or the final verification stage, no wireless communication system is implemented without the input of measurement data. However, measurement acquisition in in-building environments is much more tedious and time consuming than in the macrocellular environment where measurement acquisition is carried out using Global Positioning System data to determine the location of the measurement being taken. Global Positioning System (GPS) data, which so many RF engineers have come to rely upon for outdoor measurement acquisition, is not an option for microcell environments. Therefore, recording real-time measurement data within a building becomes a laborious, time-consuming task involving scratched notes and blueprints and manual data entry which are both expensive and ineffectual in many respects.

In addition to measuring RF signal properties from emitted base transceivers there is also a need to measure data throughput time in computer data networks. Throughput time is the time required to transfer a record or file of known size from one computer to another. In order to standardize the measurement of data throughput time for comparison or verification purposes, files of a set size (e.g. 100K) are used and transferred in packet sizes such as 512 bytes. Similar to RF signal attenuation, data throughput time is also a function of transmission distance and signal obstruction (e.g. walls, doors, partitions), as well as multipath propagation and the specific radio modem design.

Various signal property measurement acquisition tools and systems have been developed to aid in the design of wireless communication systems such as PenCat™, Walkabout PCS™ and TEMS Light.

LCC International Inc. offers the PenCat™ as a pen-based collection and analysis tool for wireless communication design that runs on a small hand-held tablet computer. The PenCat™ system enables a user to roam about a building, take signal property measurement data at a location in the building using a receiver linked to the tablet computer, and link the measured data to that building location on a computer map representing the building by tapping the appropriate portion of the map on the computer screen with a stylus pen. The building map can be entered into the PenCat™ system by either scanning blueprints, sketching the building within the application, or importing from another source.

Safco Technologies, Inc. offers the Walkabout PCS™ system as a portable survey coverage system for use in indoor or outdoor wireless communication system design. Similar to PenCat™, the Walkabout PCS™ system utilizes a hand-held computer linked to a receiver for measuring signal properties at a given location and linking the measured property data to that location represented on a stored computer map.

Ericsson Radio Quality Information Systems offers the TEMS Light system as a verification tool for wireless communication indoor coverage. The TEMS Light system utilizes a Windows-based graphical interface on a mobile computer linked to a receiver to allow a user to view a stored building map, make location specific data measurements, and link the measured data to the represented location on the stored computer map.

In addition to the above-discussed wireless communication systems verification tools, various wireless communication system prediction tools have also been devised such as Wireless Valley Communications Incorporated's Predictor™ and Ericsson Radio Quality Information Systems' TEMS. Predictor™ allows a wireless communication system designer to predict the coverage area of a particular wireless system in a building or across multiple buildings. Predictor™ creates a computer simulation using a computer stored building or facility database and a defined transceiver location and type within the database. Based on the building configuration and building material properties defined in the database a prediction of the coverage area of the wireless system is extrapolated by site-specific propagation whereby rays drawn between the transmitter and receiver and three-dimensional building information are used for prediction computations. The TEMS system predicts indoor coverage of a wireless system based on a stored building map and input base transceiver locations and types using statistical radio coverage models.

While the above-mentioned design and verification tools have aided wireless system designers in creating indoor wireless communication systems using building drawings and linking data measurements to building drawings, none of the devices, except Predictor™, incorporate three-dimensional building drawings to enhance the design process. Further, the above-mentioned devices and systems lack the ability to track a roving user within the building while the user is taking measurement data. Even further, none of the above-mentioned devices contemplates measuring data throughput properties for a computer data network at various locations within a facility. These capabilities may be required for installation and management of wireless devices for global network access.

SUMMARY OF THE INVENTION

It is therefore an object of the present invention to facilitate measurement data acquisition for designing wireless communication systems within a facility.

It is another object of the present invention to scan, sketch, or import drawings of a facility into a computer to create a three-dimensional drawing database.

It is another object of the present invention to embed measured location-specific signal properties in a site-specific three-dimensional drawing database.

It is yet another object of the present invention to embed measured location-specific LAN data throughput properties in a site-specific three-dimensional drawing database.

It is still another object of the present invention to track a user within a building using a distance measuring mechanism and a stored site-specific three-dimensional drawing database.

It is yet another object of the present invention to average incoming measurement data over an interval of time or a unit distance.

The invention uses a three-dimensional drawing database of a facility and can position measured site-specific signal property information within a microcell environment using small, portable transceivers or receivers which continually report their measurement findings in real-time through a communication link with a computer (e.g., serial port, parallel port, or buffering circuit). The computer may be a personal computer, laptop, or other mobile computer. The process of taking in-building measurement data is then reduced to simply setting up a test transmitter at the selected facility site, configuring the transmitter within the three-dimensional drawing database, connecting the portable transceiver or receiver to the computer, and roaming throughout the three-dimensional drawing environment, identifying where the receiver is in the building at any given time by pointing and clicking within the drawing or employing a location tracking mechanism. A wheeled tracking mechanism is carried with a user and linked to the computer for measuring roaming distance between time intervals based on the number of wheel rotations. At each time interval the receiver location is identified, using the distance traveled by the tracking mechanism. Simultaneously, measurement data from the connected receiver is recorded, logged, and embedded directly in the three-dimensional drawing at the identified location. While the wheeled tracking mechanism is described in the preferred embodiment, other types of tracking or distance measuring devices can be used (e.g. laser range finder, sonar range finder).

An alternative to using a tracking device is to select a starting location in the stored three-dimensional facility drawing database and begin walking and measuring signal properties. Then select a stopping location once the walking and measuring process is stopped. Based on the starting and stopping locations the computer calculates a straight line path between the locations and distributes the measured data in one of several user specified formats. The user may specify that the measured data be distributed along the path at intervals of time, distributed along the path at units of length, or averaged and distributed along the path at units of length or time.

Using similar measurement acquisition methods described above the data throughput properties of a wireless computer data network can also be measured. This is accomplished by creating a link between a server computer and a mobile client computer, transferring a record of standardized size between the server and mobile client computer, and measuring the time required to transfer the record. This process can be carried out at a plurality of locations within a facility. At each location the measured time is recorded and embedded at the measurement location within a three-dimensional facility drawing database. Additionally, the server computer can also be mobile.

In addition to creating a three-dimensional database model and performing measurements in in-facility wireless communications and data networks the invention is capable of verifying the signal properties and data throughput properties of existing wireless communication and data networks.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 1:
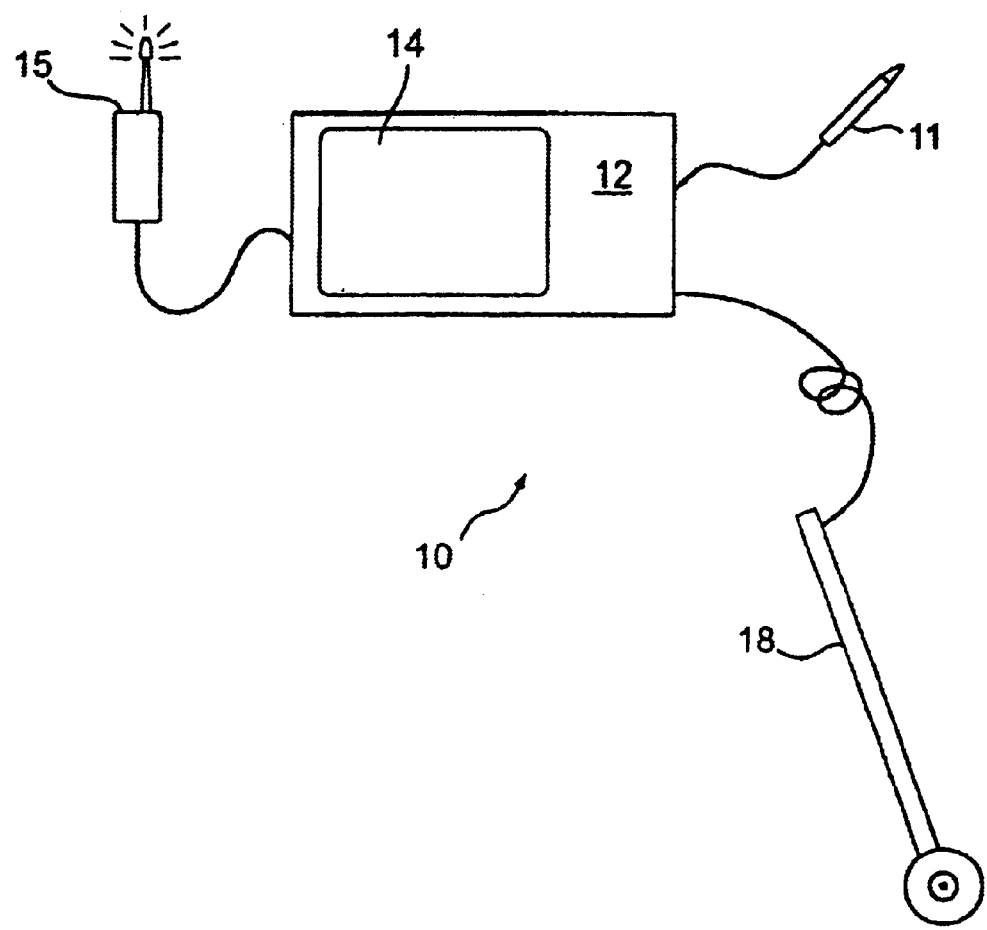
FIG. 1 is a schematic representation of the preferred embodiment of the measuring apparatus.

Referring now to FIG. 1 there is shown a mobile system 10 for measuring location-specific signal properties within a facility such as a building or a campus of buildings (not shown). A transceiver or receiver 15 for receiving signals from a base transceiver is connected to a mobile computer 12 through the computer's serial port (not shown). The computer 12 runs a software program (not shown) and has a display 14 for displaying a three-dimensional facility drawing stored on the mobile computer's disk drive and a wheeled distance measuring device 18 for measuring the distance traversed by the user of the mobile computer 12 as he/she roams about the facility. When measurement data is to be recorded, the user may manually point and click on the building drawing portion on the display 14 representing his/her actual location in the facility and take a measurement. Once recorded, the measurement data will be logged and embedded in the stored three-dimensional building drawing database at that location. Alternately, the user may employ the distance measuring device 18 connected to the mobile computer 12. Using the distance measuring device 18 a user may select a starting point in the building drawing displayed on the computer display 14 using manual coordinate input or a point and click device 11. Once the starting point is defined the user begins walking in a predefined direction such that at periodic time intervals the distance from the input starting point is recorded and signal measurement is taken. Both the distance measurement and signal measurement are embedded in the building drawing database as a measurement and corresponding building drawing location. Alternately, in addition to or in lieu of the wheeled distance measuring device 18 shown in FIG. 1, other distance measuring devices may be used.

The three-dimensional building drawing database stored in the mobile computer 12 may be imported from another computer, scanned in from an existing paper drawing, or drawn using the computer 12. Regardless of how the drawings are entered into mobile computer 12, the drawings may be manipulated and modified within the computer depending on the needs of the user.

The system described in FIG. 1 is capable of interfacing with a variety of transceivers or receivers such as, but not limited to, the ZK-Celltest SAM with cellular phone and real-time serial port interface, the Tektronix 2782 Spectrum Analyzer with a real-time IEEE 488.2M interface, a Proxim RangeLAN™ wireless modem, and a receiver without real-time interface.

Figure 2A:
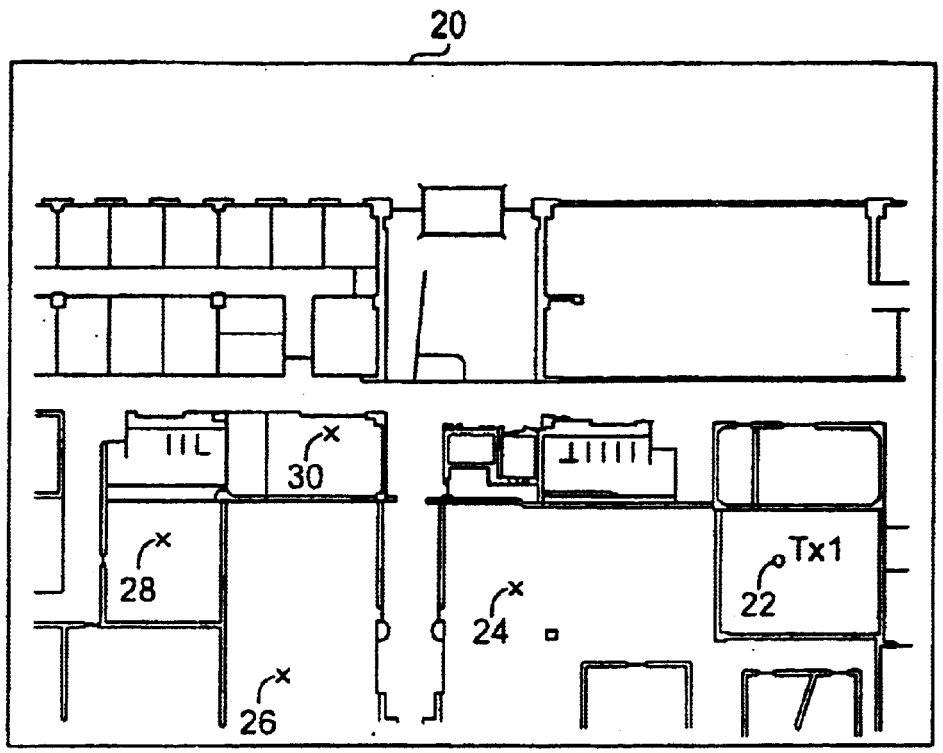
FIG. 2A is a representation of a computer screen according the preferred embodiment of the present invention showing a top view of a building floor plan with various measurement location points.

FIG. 2A shows a portion of a building floor represented on a computer screen 20 using a stored three-dimensional building drawing database. The building floor plan is shown as a typical top plan view wherein walls and partitions are noted by double lines and doorways are denoted by dotted lines. Before measurement gathering, the location of a base transceiver 22 is first entered into the three-dimensional building drawing database wherein the location is the two-dimensional position (x and y axis) of the transceiver within the plane of the floor and the height (z) of the transceiver above the floor. Then the user roams throughout the building with a mobile measuring apparatus as shown in FIG. 1, selects a location point 24, and measures the desired signal properties received from the transceiver 22. The measured signal properties are then logged and embedded into the three-dimensional building drawing database at the selected location point. After selecting a location 24 and making a measurement, the user may select more locations 26, 28, 30 and take more measurements at these respective locations for embedding in the building drawing database. Similar to the transceiver location, the height above the floor of measurement locations 24, 26, 28, 30 can also be specified. Hereinafter, location will be considered a three-dimensional position.

Figure 2B:
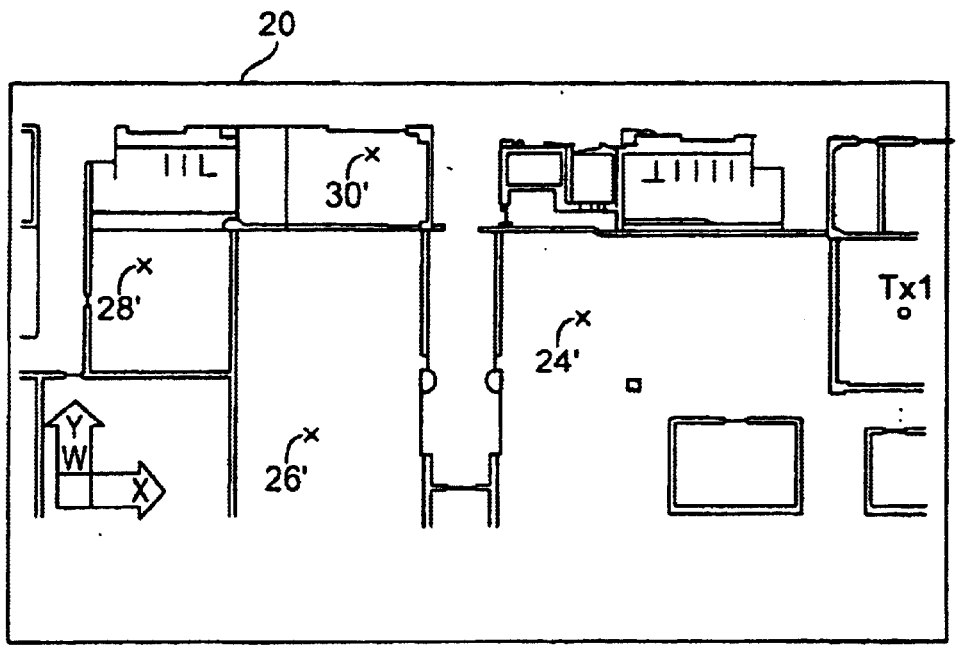
FIG. 2B is a representation of a computer screen according the preferred embodiment of the present invention showing a top view of a building floor plan with measured data values at their respective measurement points.

After the location-specific measurements 24, 26, 28, 30 have been taken, logged and embedded into the building drawing database, the results for each location can be displayed on the computer screen 20 as shown in FIG. 2B by 24', 26', 28', 30'. For example, as shown at point 24, a measured signal of −78.0 dBm was recorded, at point 26 a measured signal of −88.1 dBm was recorded, and so on.

Figure 3:
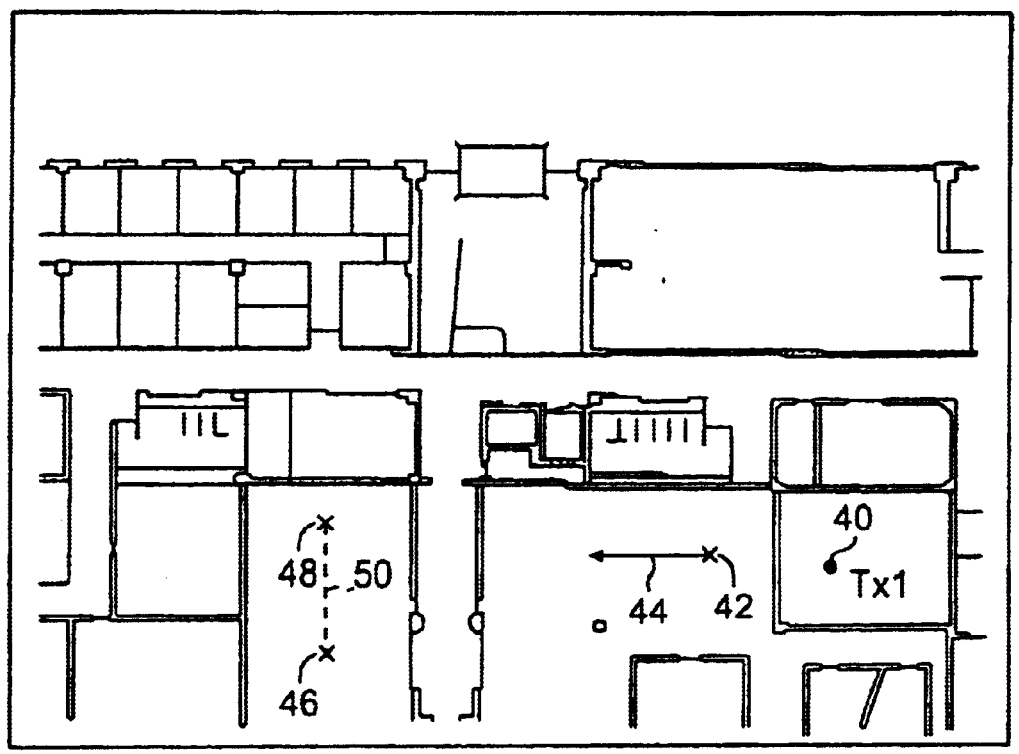
FIG. 3 is a representation of a computer screen according the preferred embodiment of the present invention showing a top view of a building floor plan with measurement acquisition locations.

FIG. 3 shows an alternate method for measurement acquisition using a user location tracking device. First, the base transmitter type and location 40 are defined in the building drawing database. Then a starting location 42 and a direction of travel 44 are defined in the building drawing database. Once the starting location 42 and direction of travel 44 are defined, the user simply starts the measurement process and walks in the defined direction. While walking, signal property measurements and the distance traveled from the starting point 42 are taken at periodic time intervals. Then using the defined starting point 42, direction of travel 44, and distance traveled a location within the building is calculated by the mobile user computer and the recorded measurement and location are embedded in the building drawing database. Several signal property measurements and corresponding distance measurements can be taken between the starting point 42 and the end of the operation. Additionally, instead of defining a direction of travel, start and stop points 46 and 48, respectively, may be defined within the drawing database such that the user walks between the two points 46 and 48, and a tracking device 18 measures the distance traveled while signal property measurements are taken at periodic time intervals and embedded in the building drawing database at the calculated location between points 46 and 48.

Another method of acquiring measurement data is for the user to specify a starting location 46, by clicking on the displayed building database, and walk a straight path while the attached measurement receiver is measures signal properties of signals emitted from base transceiver 40. The user then identifies the location 48 where he/she stopped walking, by clicking on the displayed building database. The computer then calculates a linear path 50 between the start 46 and stop 48 points. After the linear path 50 is calculated, the user has several options for distributing the measured data along the linear path 50 for subsequent embedding in the building drawing database. The user can specify that data should be recorded and embedded at specified time intervals. In this case, the recorded data is spaced evenly along the linear path 50 with each sequential measurement separated by the specified time interval. The other option is to distribute by distance. In this case, the recorded data is spaced evenly along the linear path 50 with each sequential measurement separated by a specified unit length. If more measurement data is available than recording slots along the path, the data can be averaged.

Using the measurement acquisition methods described in conjunction with FIGS. 2A and 3, signal properties can be measured at each floor of a multi-story building separately or all floors can be measured in a single run so long as the appropriate floor location is entered at the time of a measurement recording. Once measurements are recorded for the desired floors a three-dimensional model can be formed by either joining the separate floor measurements or using the single run having multiple floors.

Figure 4A:
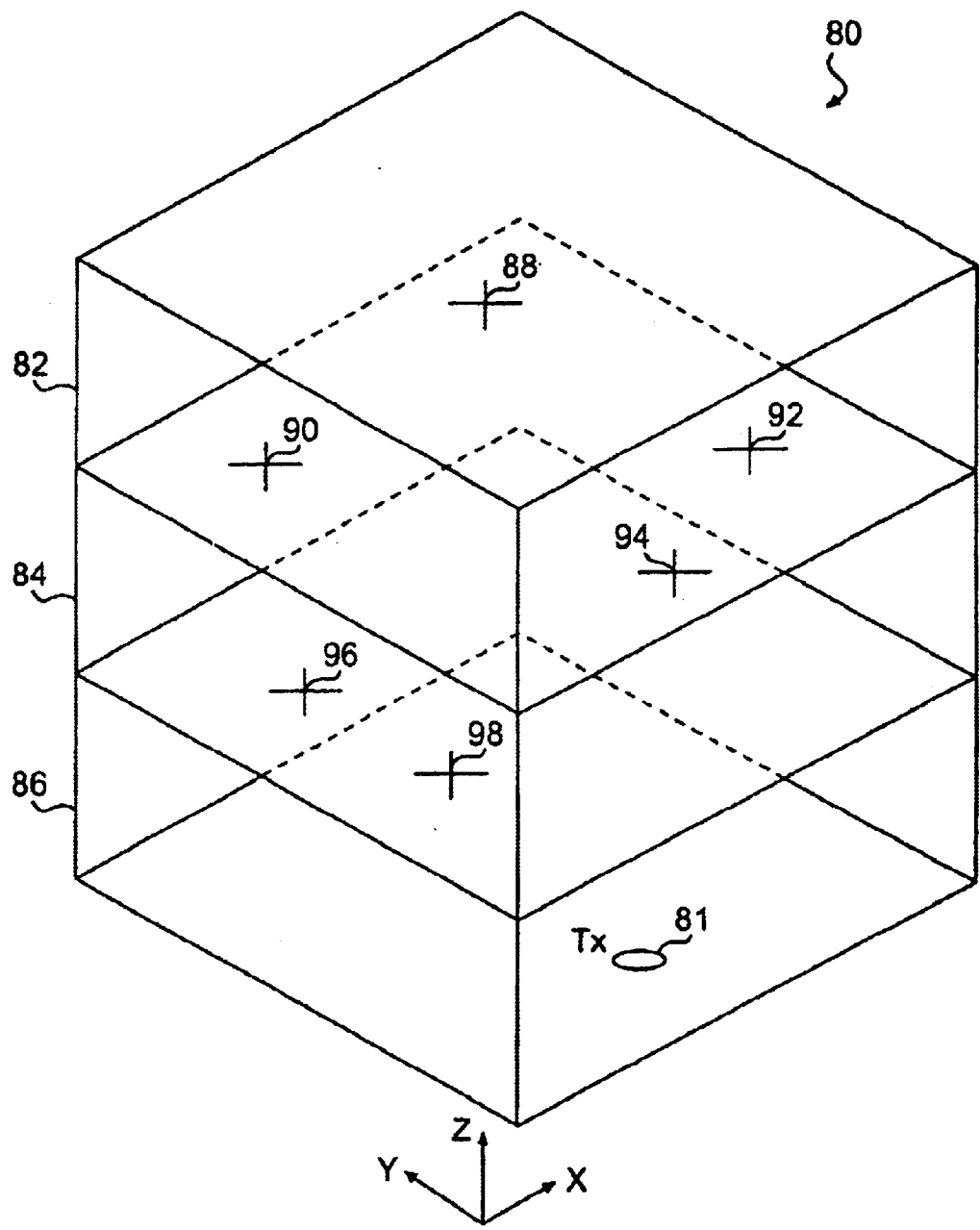
FIG. 4A is a perspective view of a three-dimensional building drawing as viewed from a computer display.

FIG. 4A shows a three-dimensional representation of a building 80 as might be seen on a mobile computer screen (FIG. 1). The building 80 has three floors 82, 84, 86. Measurement of the signal properties from transceiver 81 on floor 86 may be accomplished either on a floor by floor basis or as a single run. For example, signal property measurement locations 88, 90, 92 are measured on floor 82 and stored. Then, signal property measurement locations 94, 96 are measured on floor 84 and stored. Then, signal property measurement location 98 is measured on floor 86 and stored. Finally, all of the stored floors 82, 84, 86 along with the measured data embedded in each floor, may be aligned and joined together as a single database from which a model of the measured signal properties may be constructed. Alternately, measurement locations 88, 90, 92, 94, 96, 98 may be taken in random order and input into a single multi-floor database so long as the correct location of measurement us given. The correct location means the floor with the height above the floor (Z axis) on which the measurement is being taken and the location coordinates within the plane of the floor (X and Y axis) where the measurements are taken.

Figure 4B:
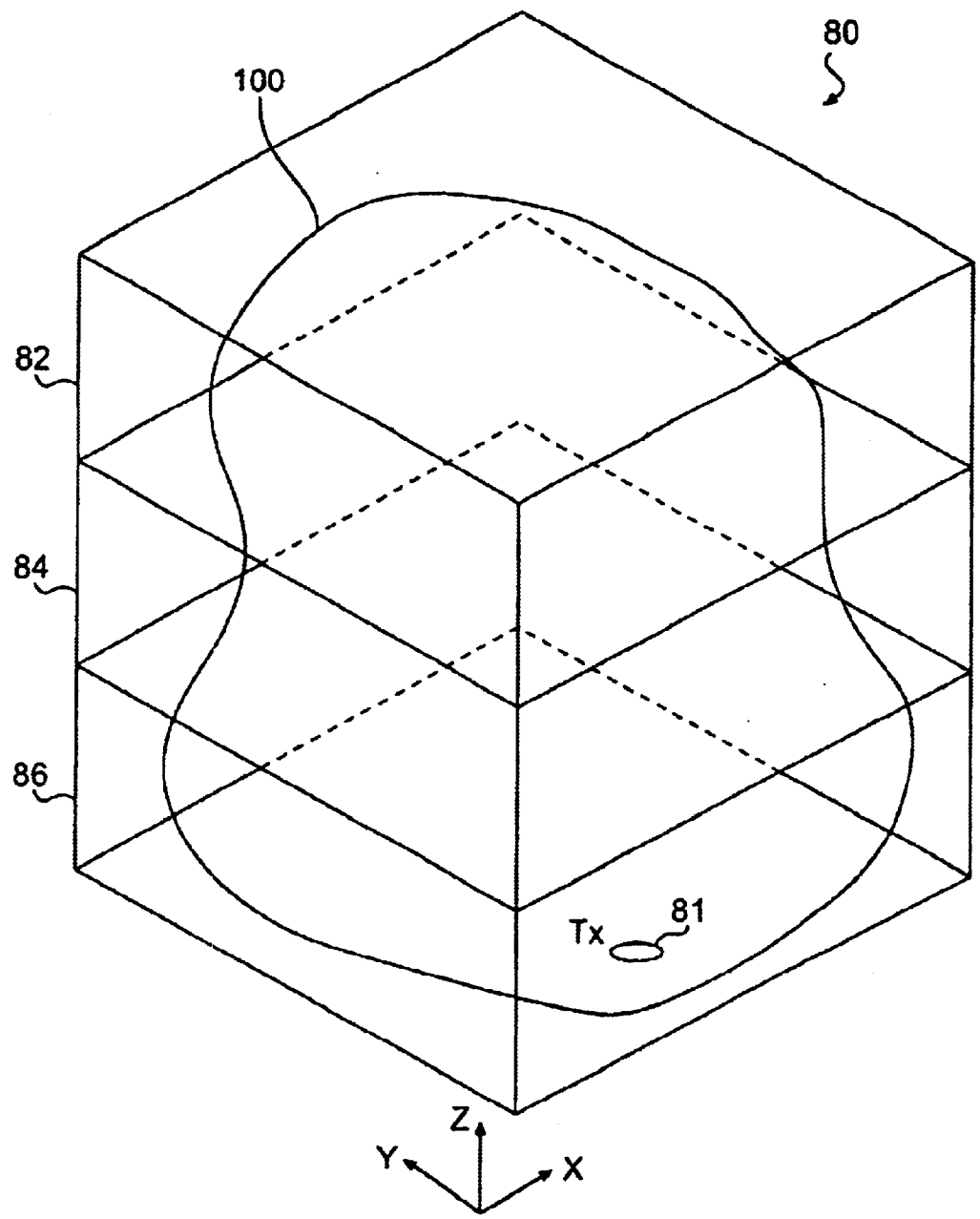
FIG. 4B is a perspective view of a three-dimensional building drawing and computer model of measured signal properties as viewed from a computer display.

FIG. 4B is a three-dimensional computer model of measured signal properties taken in FIG. 4A wherein the model may represent the best coverage area in building 80 based on the location of transceiver 81. However, it should be understood that the model 100 is simplified for exemplary purposes. Actual models will vary greatly in shape, size and complexity due to building configurations, transceiver placement, building materials, and the data being represented. Additionally, models can be created for any measured signal property.

Figure 5A:
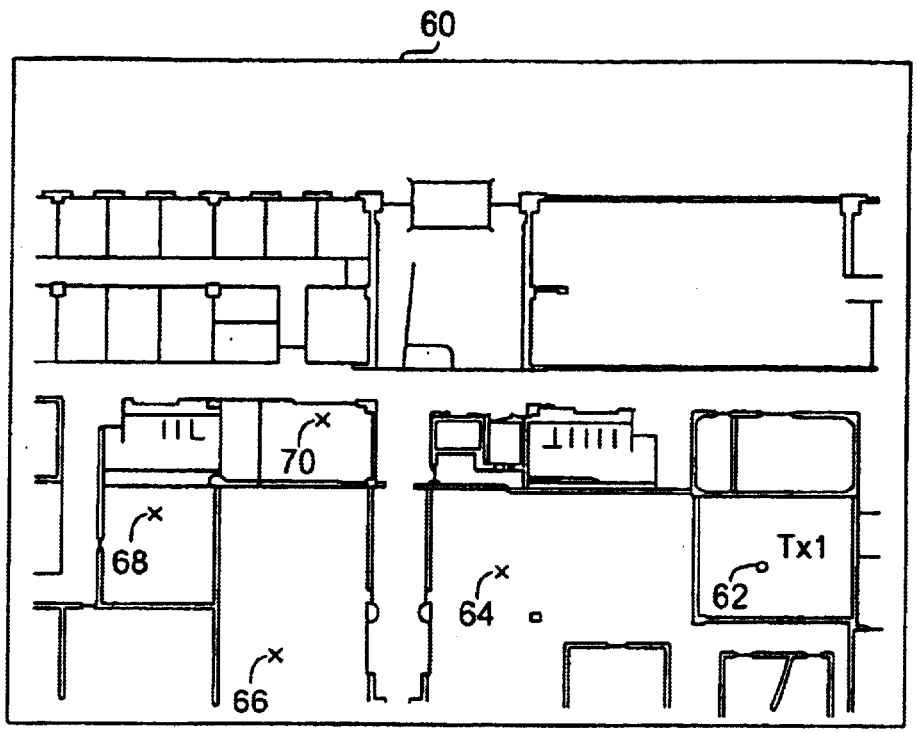
FIG. 5A is a representation of a computer screen according to the preferred embodiment of the present invention showing a top view of a building floor plan with various measurement location points.

FIG. 5A shows a portion of a building floor represented on a computer screen 60 using a stored facility drawing database. The building floor plan is shown as a typical top plan view wherein walls and partitions are noted by double lines and doorways are denoted by dotted lines. Before measurement gathering, the location of a base server computer 62 is first entered into the facility drawing database. Then the user roams throughout the facility with a mobile measuring apparatus as shown in FIG. 1, selects a location point 64, initiates a File Transfer Protocol (FTP), and connects to the base server computer 62 as a client. Once connected to the base server computer 62 the mobile measuring apparatus acting as a client computer transfers a selectable standard size file (e.g. between 1 Kb and 10 Mb) and a selectable packet size (e.g. 32 bytes to 4 Kb) to the base server computer and records the data throughput time for location 64. The measured and recorded data throughput time is then embedded into the building drawing database at the selected location point 64. After selecting a location 64 and making a measurement, the user may select more locations 66, 68, 70 and take more measurements at these respective locations for embedding in the building drawing database.

Figure 5B:
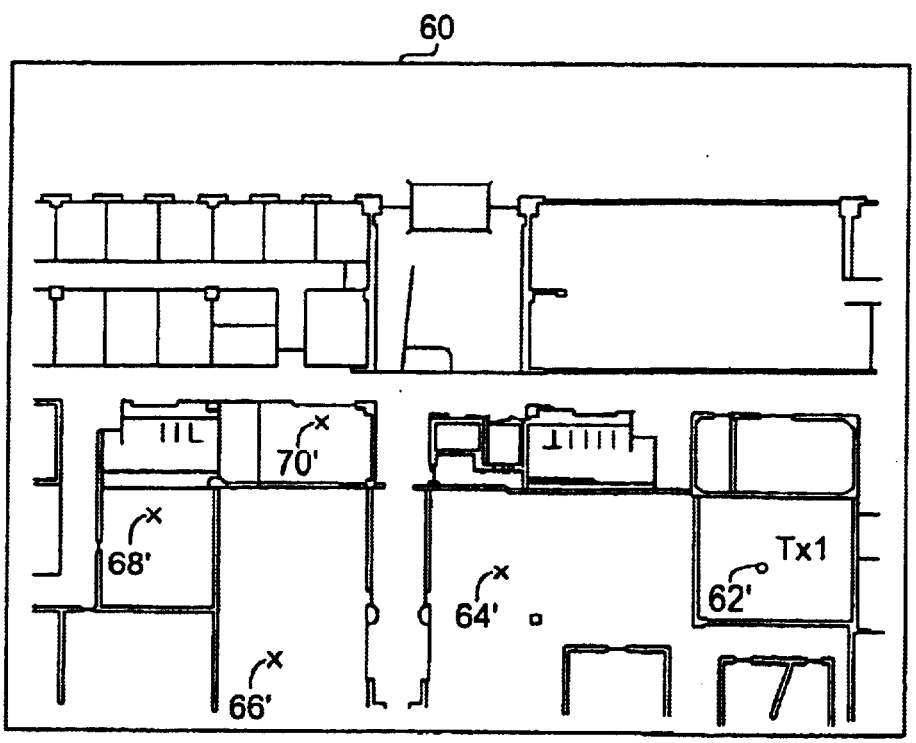
FIG. 5B is a representation of a computer screen according the preferred embodiment of the present invention showing a top view of a building floor plan with measured data throughput values at their respective measurement points.

After the location-specific measurements 64, 66, 68, 70 have been taken, logged and embedded into the building drawing database, the results for each location can be displayed on the computer screen 60 as shown in FIG. 5B by 64', 66', 68', 70'. For example, as shown at point 64', a measured throughput time of 54.2 kbps was recorded, at point 66' a measured throughput time of 53.0 kbps was recorded, and so on.

The data throughput property gathering scheme outlined in conjunction with FIG. 5A can be carried out for each floor in a multi-floor facility or, as shown in FIG. 4A, as a single run so long as the correct floor is selected from the facility drawing database at the time of measurement. Once data throughput measurements are recorded for the desired floors a three-dimensional model can be formed by either joining the separate floor measurements or using the single run containing multiple floors. Similar to FIG. 4B, a three-dimensional computer model created from the measured data may be configured to model the measured throughput properties in various useful ways such as the best throughput time locations or the degradation or improvement of throughput time based on location.

Note that in addition to data throughput rate over the wireless channel, the present invention incorporates the ability to measure frame errors, packet retries, network data throughput, and network delay due to the fixed non-wireless portion of any network, such capabilities being dependent upon the specific connected radio transceivers or receivers and the particular transfer protocol.

While the invention has been described in terms of its preferred embodiments, those of skill in the art will recognize that the invention can be practiced with modification within the spirit and scope of the appended claims.

We claim:

1. A system for creating a computer database model of measured signal properties within a facility, comprising:
   at least one base transceiver for transmitting or receiving signals;
   at least one mobile transceiver or receiver for measuring signal properties at one or more locations within said facility;
   means for representing said facility in a computer database model;
   means for determining a location of said mobile transceiver or receiver within said facility; and
   means for embedding measured signal properties as they are made at said location within said computer database model of said facility, said means for determining and said means for embedding being operable at said one or more locations.

2. A system for creating a computer database model of measured signal properties within a facility as claimed in claim 1 wherein said facility is a multi-level building.

3. A system for creating a computer database model of measured signal properties within a facility as claimed in claim 1 wherein said facility is a plurality of multi-level buildings.

4. A system for creating a computer database model of measured signal properties within a facility as claimed in claim 1 wherein said computer database model of said facility is a three-dimensional model.

5. A system for creating a computer database model of measured signal properties within a facility as claimed in claim 1 wherein said means for determining operates on an automated basis.

6. The system for creating a computer database model of measured signal properties within a facility as claimed in claim 1 further comprising means for displaying said computer database model of said facility with embedded measured signal properties.

7. The system for creating a computer database model of measured signal properties within a facility as claimed in claim 1 wherein said means for determining a location is a location tracking or positioning device.

8. The system for creating a computer database model of measured signal properties within a facility as claimed in claim 1 wherein said measured signal properties are selected from the group consisting of RF signal strength, signal interference, coverage, frame errors, frame error rate, packet retires, network data throughput, throughput time, network delay, measured throughput properties, best throughput time locations, degradation of throughput based on locations, and improvement of throughput based on location.

9. The system for creating a computer database model of measured signal properties within a facility as claimed in claim 1 wherein said computer database model includes site specific information.

10. The system for creating a computer database model of measured signal properties within a facility as claimed in claim 9 further comprising means for forming site-specific models of measured signal properties selected from the group consisting of RF signal strength, signal interference, coverage, frame errors, frame error rate, packet retries, network data throughput, throughput time, network delay, measured throughput properties, best throughput time location, degradation of throughput based on location, and improvement of throughput based on location.

11. The system for creating a computer database model of measured signal properties within a facility as claimed in claim 10 wherein site specific models formed by said means for forming model a network selected from the group consisting of microcell communications systems, local area networks, wireless local area networks, wide area networks, campus and in-building wireless and wired communication networks, data networks, and wireless communication networks.

12. The system for creating a computer database model of measured signal properties within a facility as claimed in claim 1 further comprising a means for manipulating or modifying one or more drawings in said computer database model.

13. The system for creating a computer database model of measured signal properties within a facility as claimed in claim 12 wherein said means for manipulating or modifying allows altering site specific content of said one or more drawings.

14. The system for creating a computer database model of measured signal properties within a facility as claimed in claim 1 wherein said computer database model represents a three dimensional position location by specifying a point in space using an x, y coordinate pair and a height value above a floor or ground within a facility.

15. The system for creating a computer database model of measured signal properties within a facility as claimed in claim 1 wherein said computer database model represents a two-dimensional location as a point on a top-plan view of a floor plan of said facility.

16. The system for creating a computer database model of measured signal properties within a facility as claimed in claim 1 wherein said computer database model identifies a transmitter, receiver or transceiver location within said facility.

17. The system for creating a computer database model of measured signal properties within a facility as claimed in claim 16 wherein an identified transmitter, receiver or transceiver location within said facility is altered by movement of said transmitter, receiver or transceiver.

18. The system for creating a computer database model of measured signal properties within a facility as claimed in claim 1 wherein said computer database model includes at least one floor plan of one or more floors of one or more buildings in said facility.

19. The system for creating a computer database model of measured signal properties within a facility as claimed in claim 1 wherein said computer database model includes a plurality of floor plans of one or more floors of one or more buildings in said facility.

20. The system for creating a computer database model of measured signal properties within a facility as claimed in claim 1 further comprising means for verifying performance of communication or data networks.

21. The system for creating a computer database model of measured signal properties within a facility as claimed in claim 1 further comprising means for averaging measured signal properties over space or time.

22. The system for creating a computer database model of measured signal properties within a facility as claimed in claim 1 wherein measured signal properties are embedded in said computer database model using periodic distance intervals.

23. The system for creating a computer database model of measured signal properties within a facility as claimed in claim 1 wherein measured signal properties are embedded in said computer database model using periodic time intervals.

24. The system for creating a computer database model of measured signal properties within a facility as claimed in claim 23 wherein said site specific content of said one or more drawings is selected from the group consisting of building materials, building configuration, transceiver locations, measurement locations, modeled signal properties, modeled network properties, partition types, measured signal properties, and measured network properties.

25. The system for creating a computer database model of measured signal properties within a facility as claimed in claim 1 wherein said means for embedding embeds measured signal properties taken while said mobile receiver or transceiver is moving throughout said facility.

26. The system for creating a computer database model of measured signal properties within a facility as claimed in claim 1 wherein said means for embedding embeds measured signal properties taken while said mobile receiver or transceiver is stationary at a selected location in said facility.

27. The system for creating a computer database model of measured signal properties within a facility as claimed in claim 1 further comprising a means for defining a direction of travel of said mobile receiver or transceiver.

28. The system for creating a computer database model of measured signal properties within a facility as claimed in claim 1 further comprising a means for defining a starting point and an ending point for said mobile receiver or transceiver.

29. The system for creating a computer database model of measured signal properties within a facility as claimed in claim 1 further comprising means for joining separate floor measurements collected within said facility.

30. The system for creating a computer database model of measured signal properties within a facility as claimed in claim 1 wherein said computer database model provides a three dimensional representation of said facility with embedded measurements obtained from said means for embedding.

31. A system for creating a computer database model for recorded network properties within a facility, comprising:
   a mobile client computer for roving within a facility;
   a server computer for hosting said mobile client computer;
   means for recording network properties between said mobile client computer and said server computer or other mobile client computer at a plurality of locations within said facility;
   means for representing said facility in a database model; and
   means for embedding said recorded network properties at each of said plurality of locations within said database model of said facility.

32. A system for creating a computer database model for recorded network properties within a facility as claimed in claim 31, wherein said recorded network properties include recorded data as a function of time or location within said facility.

33. A system for creating a computer database model for recorded network properties within a facility as claimed in claim 31, wherein said facility is a multi-level building.

34. A system for creating a computer database model for recorded network properties within a facility as claimed in claim 31, wherein said facility comprises a plurality of multi-level buildings.

35. A system for creating a computer database model for recorded network properties within a facility as claimed in claim 31 wherein said system includes a means for periodically determining a location of said mobile client computer within said facility.

36. A system for creating a computer database model for recorded network properties within a facility as claimed in claim 35 wherein said means for periodically determining operates on an automated basis.

37. A system for creating a computer database model for recorded network properties within a facility as claimed in claim 31 wherein said means for embedding operates on an automated basis.

38. A system for creating a computer database model for recorded network properties within a facility as claimed in claim 31, wherein said database model of said facility is a three-dimensional model.

39. A system for creating a computer database model for recorded network properties within a facility as claimed in claim 31, wherein said server computer is mobile within said facility.

40. A system for creating a computer database model for recorded network properties within a facility as claimed in claim 31, wherein said network properties include data throughput rate, frame errors, packet retries, network data throughput, and network delay due to a fixed non-wireless portion of a network.

41. The system for creating a computer database model of recorded network properties within a facility as claimed in claim 31 wherein said network properties are selected from the group consisting of RF signal strength, signal interference, coverage, frame errors, frame error rate, packet retries, network data throughput, throughput time, network delay, measured throughput properties, best throughput time locations, degradation of throughput based on locations, and improvement of throughput based on location.

42. The system for creating a computer database model for recorded network properties within a facility as claimed in claim 31 further comprising means for displaying said computer database model of said facility with embedded recorded network properties.

43. The system for creating a computer database model for recorded network properties within a facility as claimed in claim 31 further comprising a location tracking or positioning device for determining a position of said mobile client computer in said facility.

44. The system for creating a computer database model for recorded network properties within a facility as claimed in claim 31 wherein said means for embedding operates to embed said recorded network properties as they are made.

45. The system for creating a computer database model for recorded network properties within a facility as claimed in claim 31 wherein said computer database model includes site specific information.

46. The system for creating a computer database model of recorded network properties within a facility as claimed in claim 45 further comprising means for forming site-specific models of network properties selected from the group consisting of RF signal strength, signal interference, coverage, frame errors, frame error rate, packet retries, network data throughput, throughput time, network delay, measured throughput properties, best throughput time locations, degradation of throughput based on locations, and improvement of throughput based on location.

47. The system for creating a computer database model for recorded network properties within a facility as claimed in claim 46 wherein site specific models formed by said means for forming model a network selected from the group consisting of microcell communications systems, local area networks, wireless local area networks, wide area networks, campus and inbuilding wireless and wired communication networks, data networks, and wireless communication networks.

48. The system for creating a computer database model for recorded network properties within a facility as claimed in claim 45 wherein said site specific content of said one or more drawings is selected from the group consisting of building materials, building configuration, transceiver locations, measurement locations, modeled signal properties, modeled network properties, partition types, measured signal properties, and measured network properties.

49. The system for creating a computer database model for recorded network properties within a facility as claimed in claim 31 further comprising a means for manipulating or modifying one or more drawings in said computer database model.

50. The system for creating a computer database model for recorded network properties within a facility as claimed in claim 49 wherein said means for manipulating or modifying allows altering site specific content of said one or more drawings.

51. The system for creating a computer database model for recorded network properties within a facility as claimed in claim 50 wherein said site specific content of said one or more drawings is selected from the group consisting of building materials, building configuration, transceiver locations, measurement locations, modeled signal properties, modeled network properties, partition types, measured signal properties, and measured network properties.

52. The system for creating a computer database model of recorded network properties within a facility as claimed in claim 31 wherein said computer database model represents a three dimensional position location by specifying a point in space using an x, y coordinate pair and a height value above a floor or ground within a facility.

53. The system for creating a computer database model of recorded network properties within a facility as claimed in claim 31 wherein said computer database model represents a two-dimensional location as a point on a top-plan view of a floor plan of said facility.

54. The system for creating a computer database model of recorded network properties within a facility as claimed in claim 31 wherein said computer database model identifies a transmitter, receiver or transceiver location within said facility.

55. The system for creating a computer database model for recorded network properties within a facility as claimed in claim 54 wherein an identified transmitter, receiver or transceiver location within said facility is altered by movement of said transmitter, receiver or transceiver.

56. The system for creating a computer database model for recorded network properties within a facility as claimed in claim 31 wherein said computer database model includes at least one floor plan of one or more floors of one or more buildings in said facility.

57. The system for creating a computer database model for recorded network properties within a facility as claimed in claim 31 wherein said computer database model includes a plurality of floor plans of one or more floors of one or more buildings in said facility.

58. The system for creating a computer database model for recorded network properties within a facility as claimed in claim 31 further comprising means for verifying performance of communication or data networks.

59. The system for creating a computer database model of recorded network properties within a facility as claimed in claim 31 further comprising means for averaging measured network properties over space or time.

60. The system for creating a computer database model for recorded network properties within a facility as claimed in claim 31 wherein measured network properties are embedded in said computer database model using periodic distance intervals.

61. The system for creating a computer database model for recorded network properties within a facility as claimed in claim 31 wherein recorded network properties are embedded in said computer database model using periodic time intervals.

62. The system for creating a computer database model for recorded network properties within a facility as claimed in claim 31 wherein said means for embedding embeds said network properties as they are measured.

63. The system for creating a computer database model for recorded network properties within a facility as claimed in claim 31 wherein said means for embedding embeds network properties taken while said mobile client computer is moving throughout said facility.

64. The system for creating a computer database model for recorded network properties within a facility as claimed in claim 31 wherein said means for embedding embeds recorded network properties taken while said mobile client computer is stationary at a selected location in said facility.

65. The system for creating a computer database model for recorded network properties within a facility as claimed in claim 31 further comprising a means for defining a direction of travel of said mobile client computer.

66. The system for creating a computer database model for recorded network properties within a facility as claimed in claim 31 further comprising a means for defining a starting point and an ending point for said mobile client computer.

67. The system for creating a computer database model for recorded network properties within a facility as claimed in claim 31 further comprising means for joining separate floor measurements collected within said facility.

68. The system for creating a computer database model for recorded network properties within a facility as claimed in claim 31 wherein said computer database model provides a three dimensional representation of said facility with embedded measurements obtained from said means for embedding.

69. A system for creating a computer database model of signal or network properties, comprising:
a database model of a facility, said database model providing a computerized representation of a facility which includes at least one building; and
means for embedding measurements of signal or network properties as they are made into said database model by inputting measurements of signal or network properties obtained from one or more locations in said facility wherein each of said measurements being input is associated with location information descriptive of a location of said one or more locations where said measurements of said signal or network properties were made within said facility.

70. The system of claim 69 further comprising a receiver or transceiver which communicates said measurement of said signal or network properties and a locating device which communicates said location information to a computer on which said database model is located.

71. The system of claim 69 wherein said receiver or transceiver automatically makes measurements at a timed interval.

72. The system of claim 69 wherein said receiver or transceiver is equipped with a means for making measurements selectively after said receiver or transceiver has been located at a desired location within said facility.

73. The system of claim 69 wherein said means for embedding operates on an automated basis.

74. The system of claim 69 further comprising means for displaying said computer database model of said facility with embedded measured signal or network properties.

75. The system of claim 69 further comprising a location tracking or positioning device.

76. The system of claim 69 wherein said computer database model includes site specific information.

77. The system of claim 76 further comprising means for forming site-specific models of measured signal or network properties selected from the group consisting of RF signal strength, signal interference, coverage, frame errors, frame error rate, packet retries, network data throughput, throughput time, network delay, measured throughput properties, best throughput time locations, degradation of throughput based on locations, and improvement of throughput based on location.

78. The system of claim 77 wherein site specific models formed by said means for forming model a network selected from the group consisting of microcell communications systems, local area networks, wireless local area networks, wide area networks, campus and inbuilding wireless and wired communication networks, data networks, and wireless communication networks.

79. The system of claim 69 wherein said measured signal or network properties are selected from the group consisting of RF signal strength, signal interference, coverage, frame errors, frame error rate, packet retries, network data throughput, throughput time, network delay, measured throughput properties, best throughput time locations, degradation of throughput based on locations, and improvement of throughput based on location.

80. The system of claim 76 wherein said site specific information is selected from the group consisting of building materials, building configuration, transceiver locations, measurement locations, modeled signal properties, modeled network properties, partition types, measured signal properties, and measured network properties.

81. The system of claim 69 further comprising a means for manipulating or modifying one or more drawings in said computer database model.

82. The system of claim 81 wherein said means for manipulating or modifying allows altering site specific content of said one or more drawings.

83. The system of claim 82 wherein said site specific content of said one or more drawings is selected from the group consisting of building materials, building configuration, transceiver locations, measurement locations, modeled signal properties, modeled network properties, partition types, measured signal properties, and measured network properties.

84. The system of claim 69 wherein said computer database model represents a three dimensional position by specifying a point in space using an x, y coordinate pair and a height value above a floor or ground within a facility.

85. The system of claim 69 wherein said computer database model represents a two-dimensional location as a point on a top-plan view of a floor plan of said facility.

86. The system of claim 69 wherein said computer database model identifies a transmitter, receiver or transceiver location within said facility.

87. The system of claim 86 wherein an identified transmitter, receiver or transceiver location within said facility is altered by movement of said transmitter, receiver or transceiver.

88. The system of claim 69 wherein said computer database model includes at least one floor plan of one or more floors of one or more buildings in said facility.

89. The system of claim 69 wherein said computer database model includes a plurality of floor plans of one or more floors of one or more buildings in said facility.

90. The system of claim 69 further comprising means for verifying performance of communication or data networks.

91. The system of claim 69 further comprising means for averaging measured signal or network properties over space or time.

92. The system of claim 69 wherein measured signal or network properties are embedded in said computer database model using periodic distance intervals.

93. The system of claim 69 wherein measured signal or network properties are embedded in said computer database model using periodic time intervals.

94. The system of claim 69 wherein said one or more locations are identified and embedded on an automated basis in said embedding step.

95. The system of claim 69 wherein said measurements of signal or network properties are embedded on an automated basis in said embedding step.

96. The system of claim 69 further comprising a display for displaying said computerized representation of said facility with embedded measurements of signal or network properties.

97. The system of claim 69 wherein said means for embedding embeds measured signal properties taken while a mobile receiver or transceiver is moving throughout said facility.

98. The system of claim 69 wherein said means for embedding embeds measured signal properties taken while a mobile receiver or transceiver is stationary at a selected location in said facility.

99. The system of claim 69 further comprising a means for defining a direction of travel of a mobile receiver or transceiver.

100. The system of claim 69 further comprising a means for defining a starting point and an ending point for a mobile receiver or transceiver.

101. The system of claim 69 further comprising means for joining separate floor measurements collected within said facility.

102. The system of claim 69 wherein said computer database model provides a three dimensional representation of said facility with embedded measurements obtained from said means for embedding.

103. A system for creating a three dimensional computer database model of signal or network properties, comprising:
a database model of a facility, said database model providing a computerized three dimensional representation of a facility which includes at least one building; and
means for embedding measurements of signal or network properties into said database model by inputting measurements of signal or network properties obtained from one or more locations in said facility wherein each of said measurements being input is associated with location information descriptive of a location of said one or more locations where said measurements of said signal or network properties were made within said facility.

104. The system of claim 103 further comprising a receiver or transceiver which communicates said measurement of said signal or network properties and a locating device which communicates said location information to a computer on which said database model is located.

105. The system of claim 103 wherein said receiver or transceiver makes measurements at a time or distance interval.

106. The system of claim 103 wherein said receiver or transceiver is equipped with a means for making measurements selectively after said receiver or transceiver has been located at a desired location within said facility.

107. The system of claim 103 wherein said means for embedding operates on an automated basis.

108. The system of claim 103 further comprising means for displaying said computer database model of said facility with embedded measured signal or network properties.

109. The system of claim 103 further comprising a location tracking or positioning device.

110. The system of claim 103 wherein said computer database model includes site specific information.

111. The system of claim 103 further comprising means for forming site-specific models of measured signal or network properties selected from the group consisting of RF signal strength, signal interference, coverage, frame errors, frame error rate, packet retries, network data throughput, throughput time, network delay, measured throughput properties, best throughput time locations, degradation of throughput based on locations, and improvement of throughput based on location.

112. The system of claim 111 wherein site specific models formed by said means for forming model a network selected from the group consisting of microcell communications systems, local area networks, wireless local area networks, wide area networks, campus and inbuilding wireless and wired communication networks, data networks, and wireless communication networks.

113. The system of claim 112 wherein said site specific information is selected from the group consisting of building materials, building configuration, transceiver locations, measurement locations, modeled signal properties, modeled network properties, partition types, measured signal properties, and measured network properties.

114. The system of claim 103 wherein said measured signal or network properties are selected from the group consisting of RF signal strength, signal interference, coverage, frame errors, frame error rate, packet retries, network data throughput, throughput time, network delay, measured throughput properties, best throughput time locations, degradation of throughput based on locations, and improvement of throughput based on location.

115. The system of claim 103 further comprising a means for manipulating or modifying one or more drawings in said computer database model.

116. The system of claim 115 wherein said means for manipulating or modifying allows altering site specific content of said one or more drawings.

117. The system of claim 116 said site specific content is selected from the group consisting of building materials, building configuration, transceiver locations, measurement locations, modeled signal properties, modeled network properties, partition types, measured signal properties, and measured network properties.

118. The system of claim 103 wherein said computer database model represents a three dimensional position by specifying a point in space using an x, y coordinate pair and a height value above a floor or ground within a facility.

119. The system of claim 103 wherein said computer database model represents a two-dimensional location as a point on a top-plan view of a floor plan of said facility.

120. The system of claim 103 wherein said computer database model identifies a transmitter, receiver or transceiver location within said facility.

121. The system of claim 120 wherein an identified transmitter, receiver or transceiver location within said facility is altered by movement of said transmitter, receiver or transceiver.

122. The system of claim 103 wherein said computer database model includes at least one floor plan of one or more floors of one or more buildings in said facility.

123. The system of claim 103 wherein said computer database model includes a plurality of floor plans of one or more floors of one or more buildings in said facility.

124. The system of claim 103 further comprising means for verifying performance of communication or data networks.

125. The system of claim 103 further comprising means for averaging measured signal measurements over space or time.

126. The system of claim 103 wherein measured signal or network properties are embedded in said computer database model using periodic distance intervals.

127. The system of claim 103 wherein measured signal or network properties are embedded in said computer database model using periodic time intervals.

128. The system of claim 103 wherein said means for embedding embeds measured signal properties taken while a mobile receiver or transceiver is moving throughout said facility.

129. The system of claim 103 wherein said means for embedding embeds measured signal properties taken while a mobile receiver or transceiver is stationary at a selected location in said facility.

130. The system of claim 103 further comprising a means for defining a direction of travel of a mobile receiver or transceiver.

131. The system of claim 103 further comprising a means for defining a starting point and an ending point for a mobile receiver or transceiver.

132. The system of claim 103 further comprising means for joining separate floor measurements collected within said facility.

133. The system of claim 103 wherein said means for embedding embed measurements of signal or network properties as they are made.

134. A method for creating a computer database model of measured signal properties within a facility, comprising at least one base transceiver for transmitting or receiving signals, and at least one mobile receiver or transceiver for measuring signal properties at one or more locations within said facility; comprising the steps of:
representing said facility in a computer database model;
determining a location of said mobile receiver or transceiver within said facility; and
embedding said measured signal properties as they are made at said location within said computer database model of said facility.

135. The method of claim 134 further comprising the step of displaying said computer database model of said facility with said embedded signals.

136. The method recited in claim 134, wherein said facility is a multi-level building, and said periodically determining includes the step of moving said mobile receiver or transceiver to a plurality of locations within said multi-level building.

137. The method recited in claim 134, wherein said facility is a plurality of multi-level buildings, and said determining step includes the step of moving said mobile transceiver to a plurality of locations within different buildings of said plurality of multi-level buildings.

138. The method recited in claim 135, wherein said representing and said displaying steps are performed in three dimensions.

139. The method recited in claim 134 wherein said determining step is performed on an automated basis.

140. The method recited in claim 134 wherein said embedding step is performed on an automated basis.

141. The method in claim 134 determining step uses a location tracking or positioning device.

142. The method of claim 134 wherein said computer database model includes site specific information.

143. The method of claim 142 wherein said site specific information is selected from the group consisting of building materials, building configuration, transceiver locations, measurement locations, modeled signal properties, modeled network properties, partition types, measured signal properties, and measured network properties.

144. The method of claim 142 further comprising the step of forming site-specific models of measured signal or network properties selected from the group consisting of RF signal strength, signal interference, coverage, frame errors, frame error rate, packet retries, network data throughput, throughput time, network delay, measured throughput properties, best throughput time locations, degradation of throughput based on locations, and improvement of throughput based on location.

145. The method of claim 144 wherein site specific models formed in said forming step model a network selected from the group consisting of microcell communications systems, local area networks, wireless local area networks, wide area networks, campus and inbuilding wireless and wired communication networks, data networks, and wireless communication networks.

146. The method of claim 134 wherein said measured signal or network properties are selected from the group consisting of RF signal strength, signal interference, coverage, frame errors, frame error rate, packet retries, network data throughput, throughput time, network delay, measured throughput properties, best throughput time locations, degradation of throughput based on locations, and improvement of throughput based on location.

147. The method of claim 134 further comprising the step of manipulating or modifying one or more drawings in said computer database model.

148. The method of claim 147 wherein said step of manipulating or modifying allows altering site specific content of said one or more drawings.

149. The method of claim 148 wherein said site specific content is selected from the group consisting of building materials, building configuration, transceiver locations, measurement locations, modeled signal properties, modeled network properties, partition types, measured signal properties, and measured network properties.

150. The method of claim 134 wherein said computer database model represents a three dimensional position location by specifying a point in space using an x, y coordinate pair and a height value above a floor or ground within a facility.

151. The method of claim 134 wherein said computer database model represents a two-dimensional location as a point on a top-plan view of a floor plan of said facility.

152. The method of claim 134 further comprising the step of identifying a transmitter, receiver or transceiver location within said facility.

153. The method of claim 152 wherein an identified transmitter, receiver or transceiver location within said facility is altered by movement of said transmitter, receiver or transceiver.

154. The method of claim 134 wherein said computer database model includes at least one floor plan of one or more floors of one or more buildings in said facility.

155. The method of claim 134 wherein said computer database model includes a plurality of floor plans of one or more floors of one or more buildings in said facility.

156. The method of claim 134 further comprising the step of verifying performance of communication or data networks.

157. The method of claim 134 further comprising the step of averaging measured signal measurements over space or time.

158. The method of claim 134 wherein measured signal properties are embedded in said computer database model using periodic distance intervals.

159. The method of claim 134 wherein measured signal properties are embedded in said computer database model using periodic time intervals.

160. The method of claim 134 wherein said embedding step embeds measured signal properties taken while said mobile receiver or transceiver is moving throughout said facility.

161. The method of claim 134 wherein said embedding step embeds measured signal properties taken while said mobile receiver or transceiver is stationary at a selected location in said facility.

162. The method of claim 134 further comprising the step of defining a direction of travel of said mobile receiver or transceiver.

163. The method of claim 134 further comprising the step of defining a starting point and an ending point for said mobile receiver or transceiver.

164. The method of claim 134 further comprising the step of joining separate floor measurements collected within said facility.

165. The method of claim 134 wherein said computer database model provides a three dimensional representation of said facility with embedded measurements obtained from said embedding step.

166. The method of claim 165 wherein said embedding step includes the steps of:
measuring one or more signal or network properties;
associating location information with each measurement made in said measuring step; and
loading said measurements made in said measuring step and location information obtained from said associating step into a computer which includes said database model.

167. The method of claim 134 wherein said embedded signal properties obtained from said embedding step are obtained in random order.

168. The method of claim 134 wherein said measurements embedded in said embedding step are obtained from one or more measurement runs throughout said facility.

169. A method for creating a computer database model for recorded network properties within a facility, comprising a mobile client computer for roving within a facility, and a server computer or other mobile client computer for hosting said mobile client computer, comprising the steps of:
recording network properties between said mobile client computer and said server computer or other mobile client computer at one or more locations within said facility;
representing said facility in a database model; and
embedding said recorded network properties at one or more locations within said database model of said facility.

170. The method of claim 169 further comprising the step of displaying said database model of said facility with said embedded network properties.

171. The method of claim 169, wherein said recording step records network properties as a function of time or location within said facility.

172. The method of claim 169 wherein said recording step includes the step of moving said mobile client computer to different locations within said facility.

173. A method of claim 169 wherein said facility comprises a plurality of buildings, each with one or more levels, and said recording step includes the step of moving said mobile client computer to different levels or different buildings within said plurality of buildings.

174. The method of claim 169 farther comprising the step of periodically determining a location of said mobile client computer within said facility.

175. The method of claim 170 wherein said representing and displaying steps are performed in three dimensions.

176. The method of claim 169 further comprising the step of moving said server computer within said facility.

177. The method of claim 169, wherein said step of embedding network properties includes embedding at least one of data throughput rate, frame errors, packet retries, network data throughput, and network delay due to a fixed non-wireless portion of a network.

178. The method of claim 169 wherein said network properties are selected from the group consisting of consisting of RF signal strength, signal interference, coverage, frame errors, frame error rate, packet retries, network data throughput, throughput time, network delay, measured throughput properties, best throughput time locations, degradation of throughput based on locations, and improvement of throughput based on location.

179. The method of claim 169 wherein said recording step is performed on an automated basis.

180. The method of claim 169 wherein said embedding step is performed on an automated basis.

181. The method of claim 169 further comprising the step of identifying said one or more locations within said facility on an automated basis.

182. The method in claim 169 further comprising the step of determining a location of said mobile client computer using a location tracking or positioning device.

183. The method of claim 169 wherein said computer database model includes site specific information.

184. The method of claim 181 wherein said site specific information is selected from the group consisting of building materials, building configuration, transceiver locations, measurement locations, modeled signal properties, modeled network properties, partition types, measured signal properties, and measured network properties.

185. The method of claim 169 further comprising the step of forming site-specific models of measured signal properties selected from the group consisting of RF signal strength, signal interference, coverage, frame errors, frame error rate, packet retries, network data throughput, throughput time, network delay, measured throughput properties, best throughput time locations, degradation of throughput based on locations, and improvement of throughput based on location.

186. The method of claim 185 wherein site specific models formed in said forming step model a network selected from the group consisting of microcell communications systems, local area networks, wireless local area networks, wide area networks, campus and inbuilding wireless and wired communication networks, data networks, and wireless communication networks.

187. The method of claim 169 further comprising the step of manipulating or modifying one or more drawings in said computer database model.

188. The method of claim 169 wherein said step of manipulating or modifying allows altering site specific content of said one or more drawings.

189. The method of claim 188 wherein said site specific content is selected from the group consisting of building materials, building configuration, transceiver locations, measurement locations, modeled signal properties, modeled network properties, partition types, measured signal properties, and measured network properties.

190. The method of claim 169 wherein said computer database model represents a three dimensional position location by specifying a point in space using an x, y coordinate pair and a height value above a floor or ground within a facility.

191. The method of claim 169 wherein said computer database model represents a two-dimensional location as a point on a top-plan view of a floor plan of said facility.

192. The method of claim 169 further comprising the step of identifying a transmitter, receiver or transceiver location within said facility.

193. The method of claim 192 wherein an identified transmitter, receiver or transceiver location within said facility is altered by movement of said transmitter, receiver or transceiver.

194. The method of claim 169 wherein said computer database model includes at least one floor plan of one or more floors of one or more buildings in said facility.

195. The method of claim 169 wherein said computer database model includes a plurality of floor plans of one or more floors of one or more buildings in said facility.

196. The method of claim 169 further comprising the step of verifying performance of communication or data networks.

197. The method of claim 169 further comprising the step of averaging measured network properties over space or time.

198. The method of claim 169 wherein measured network properties are embedded in said computer database model using periodic distance intervals.

199. The method of claim 169 wherein measured network properties are embedded in said computer database model using periodic time intervals.

200. The method of claim 169 wherein said embedding step embeds measured network properties taken while said mobile client computer is moving throughout said facility.

201. The method of claim 169 wherein said embedding step embeds measured network properties taken while said mobile client computer is stationary at a selected location in said facility.

202. The method of claim 169 further comprising the step of defining a direction of travel of said mobile client computer.

203. The method of claim 169 further comprising the step of defining a starting point and an ending point for said mobile client computer.

204. The method of claim 169 further comprising the step of joining separate floor measurements collected within said facility.

205. The method of claim 169 wherein said computer database model provides a three dimensional representation of said facility with embedded measurements obtained from said embedding step.

206. The method of claim 205 wherein said embedding step includes the steps of:

measuring one or more network properties;
associating location information with each measurement made in said measuring step; and
loading said measurements made in said measuring step and location information obtained from said associating step into a computer which includes said database model.

207. The method of claim 169 wherein said embedded signal properties obtained from said embedding step are obtained in random order.

208. A method for creating a computer database model of signal or network properties, comprising the steps of:

providing a computerized representation of a facility which includes at least one building, said computerized representation being constructed from a database model of said facility; and
embedding measurements of signal or network properties as they are made into said database model by inputting measurements of said signal or network properties obtained from one or more locations in said facility wherein each of said measurements being input is associated with location information descriptive of a location of said one or more locations where said measurements of said signal or network properties were made within said facility.

209. The method of claim 208 wherein said embedding step is performed using a receiver or transceiver which communicates said signal or network properties measurement and a locating device which communicates said location information to a computer on which said database model is located.

210. The method of claim 208 wherein said embedding step includes the step of moving said receiver or transceiver to different locations within said facility.

211. The method of claim 210 wherein measurements are made with said receiver or transceiver at a timed interval, each measurement being associated with said location information for said receiver or transceiver at said timed interval.

212. The method of claim 211 wherein measurements are made selectively with said receiver or transceiver after said receiver or transceiver has been located at a desired location within said facility.

213. The method of claim 210 wherein measurements are made with said receiver or transceiver at a distance interval, each measurement being associated with said location information for said receiver or transceiver at said distance interval.

214. The method of claim 208 wherein said computer database model is three dimensional and wherein said embedding step includes the steps of:

measuring one or more signal or network properties;
associating location information with each measurement made in said measuring step; and
loading said measurements made in said measuring step and location information obtained from said associating step into a computer which includes said database model.

215. The method recited in claim 208 wherein measurements made during said embedding step are made on an automated basis.

216. The method recited in claim 208 wherein said one or more locations are input in said embedding step on automated basis.

217. The method recited in claim 208 further comprising the step of displaying said computerized representation of said facility with embedded signal or network property measurements.

218. The method in claim 208 wherein embedding step uses data obtained from a location tracking or positioning device.

219. The method of claim 208 wherein said computer database model includes site specific information.

220. The method of claim 219 wherein said site specific information is selected from the group consisting of building materials, building configuration, transceiver locations, measurement locations, modeled signal properties, modeled network properties, partition types, measured signal properties, and measured network properties.

221. The method of claim 208 further comprising the step of forming site-specific models of measured signal properties selected from the group consisting of RF signal strength, signal interference, coverage, frame errors, frame error rate, packet retries, network data throughput, throughput time, network delay, measured throughput properties, best throughput time locations, degradation of throughput based on locations, and improvement of throughput based on location.

222. The method of claim 221 wherein site specific models formed in said forming step model a signal or network property selected from the group consisting of microcell communications systems, local area networks, wireless local area networks, wide area networks, campus and inbuilding wireless and wired communication networks, data networks, and wireless communication networks.

223. The method of claim 208 wherein said signal or network properties are selected from the group consisting of microcell communications systems, local area networks, wireless local area networks, wide area networks, campus and inbuilding wireless and wired communication networks, data networks, and wireless communication networks.

224. The method of claim 208 further comprising the step of manipulating or modifying one or more drawings in said computer database model.

225. The method of claim 224 wherein said step of manipulating or modifying allows altering site specific content of said one or more drawings.

226. The method of claim 225 wherein said site specific content is selected from the group consisting of building materials, building configuration, transceiver locations, measurement locations, modeled signal properties, modeled network properties, partition types, measured signal properties, and measured network properties.

227. The method of claim 208 wherein said computer database model represents a three dimensional position location by specifying a point in space using an x, y coordinate pair and a height value above a floor or ground within a facility.

228. The method of claim 208 wherein said computer database model represents a two-dimensional location as a point on a top-plan view of a floor plan of said facility.

229. The method of claim 208 further comprising the step of identifying a transmitter, receiver or transceiver location within said facility.

230. The method of claim 229 wherein an identified transmitter, receiver or transceiver location within said facility is altered by movement of said transmitter, receiver or transceiver.

231. The method of claim 208 wherein said computer database model includes at least one floor plan of one or more floors of one or more buildings in said facility.

232. The method of claim 208 wherein said computer database model includes a plurality of floor plans of one or more floors of one or more buildings in said facility.

233. The method of claim 208 further comprising the step of verifying performance of communication or data networks.

234. The method of claim 208 further comprising the step of averaging measured signal measurements over space or time.

235. The method of claim 208 wherein measured signal or network properties are embedded in said computer database model using periodic distance intervals.

236. The method of claim 208 wherein measured signal or network properties are embedded in said computer database model using periodic time intervals.

237. The method of claim 208 wherein said embedding step embeds measured signal network properties taken while said mobile receiver or transceiver is moving throughout said facility.

238. The method of claim 208 wherein said embedding step embeds measured signal or network properties taken while said mobile receiver or transceiver is stationary at a selected location in said facility.

239. The method of claim 208 further comprising the step of defining a direction of travel of said mobile receiver or transceiver.

240. The method of claim 208 further comprising the step of defining a starting point and an ending point for said mobile receiver or transceiver.

241. The method of claim 208 further comprising the step of joining separate floor measurements collected within said facility.

242. The method of claim 208 wherein said computer database model provides a three dimensional representation of said facility with embedded measurements obtained from said embedding step.

243. The method of claim 242 wherein said embedding step includes the steps of:

measuring one or more signal or network properties;

associating location information with each measurement made in said measuring step; and loading said measurements made in said measuring step and location information obtained from said associating step into a computer which includes said database model.

244. The method of claim 208 wherein said embedded signal or network properties obtained from said embedding step are obtained in random order.

245. The method of claim 208 wherein said measurements embedded in said embedding step are obtained from a single measurement run throughout said facility.

246. The method of claim 208 wherein said measurements embedded in said embedding step are obtained from a plurality of measurement runs throughout said facility.

247. A method for creating a three dimensional computer database model of signal or network properties, comprising the steps of:

providing a computerized three dimensional representation of a facility which includes at least one building, said computerized three dimensional representation being constructed from a database model of said facility; and embedding measurements of signal or network properties into said database model by inputting measurements of said signal or network properties obtained from one or more locations in said facility wherein each of said measurements being input is associated with location information descriptive of a location of said one or more locations where said measurements of said signal or network properties were made within said facility.

248. The method of claim 247 wherein said embedding step is performed using a receiver or transceiver which communicates said signal or network properties measurement and a locating device which communicates said location information to a computer on which said database model is located.

249. The method of claim 248 wherein said embedding step includes the step of moving said receiver or transceiver to different locations within said facility.

250. The method of claim 249 wherein measurements are made with said receiver or transceiver at a timed interval, each measurement being associated with said location information for said receiver or transceiver at said timed interval.

251. The method of claim 249 wherein measurements are made with said receiver or transceiver at a distance interval, each measurement being associated with said location information for said receiver or transceiver at said distance interval.

252. The method of claim 249 wherein measurements are made selectively with said receiver or transceiver after said receiver or transceiver has been located at a desired location within said facility.

253. The method of claim 247 wherein said embedding step includes the steps of:
measuring one or more signal or network properties;
associating location information with each measurement made in said measuring step; and
loading said measurements made in said measuring step and location information obtained from said associating step into a computer which includes said database model.

254. The method recited in claim 247 wherein measurements made during said embedding step are made on an automated basis.

255. The method in claim 247 wherein embedding step uses data obtained from a location tracking or positioning device.

256. The method recited in claim 247 wherein said one or more locations input in said embedding step are input on an automated basis.

257. The method of claim 247 wherein said computer database model includes site specific information.

258. The method of claim 247 wherein said site specific information is selected from the group consisting of building materials, building configuration, transceiver locations, measurement locations, modeled signal properties, modeled network properties, partition types, measured signal properties, and measured network properties.

259. The method of claim 247 further comprising the step of forming site-specific models of measured signal or network properties selected from the group consisting of RF signal strength, signal interference, coverage, frame errors, frame error rate, packet retries, network data throughput, throughput time, network delay, measured throughput properties, best throughput time locations, degradation of throughput based on locations, and improvement of throughput based on location.

260. The method of claim 259 wherein site specific models formed in said forming step model a network selected from the group consisting of microcell communications systems, local area networks, wireless local area networks, wide area networks, campus and inbuilding wireless and wired communication networks, data networks, and wireless communication networks.

261. The method of claim 247 wherein said measured signal or network properties are selected from the group consisting of RF signal strength, signal interference, coverage, frame errors, frame error rate, packet retries, network data throughput, throughput time, network delay, measured throughput properties, best throughput time locations, degradation of throughput based on locations, and improvement of throughput based on location.

262. The method of claim 247 further comprising the step of manipulating or modifying one or more drawings in said computer database model.

263. The method of claim 262 wherein said step of manipulating or modifying allows altering site specific content of said one or more drawings.

264. The method of claim 263 wherein said site specific content is selected from the group consisting of building materials, building configuration, transceiver locations, measurement locations, modeled signal properties, modeled network properties, partition types, measured signal properties, and measured network properties.

265. The method of claim 247 wherein said computer database model represents a three dimensional position location by specifying a point in space using an x, y coordinate pair and a height value above a floor or ground within a facility.

266. The method of claim 247 wherein said computer database model represents a two-dimensional location as a point on a top-plan view of a floor plan of said facility.

267. The method of claim 247 further comprising the step of identifying a transmitter, receiver or transceiver location within said facility.

268. The method of claim 267 wherein an identified transmitter, receiver or transceiver location within said facility is altered by movement of said transmitter, receiver or transceiver.

269. The method of claim 247 wherein said computer database model includes at least one floor plan of one or more floors of one or more buildings in said facility.

270. The method of claim 247 wherein said computer database model includes a plurality of floor plans of one or more floors of one or more buildings in said facility.

271. The method of claim 247 further comprising the step of verifying performance of communication or data networks.

272. The method of claim 247 further comprising the step of averaging measured signal measurements over space or time.

273. The method of claim 247 wherein measured signal or network properties are embedded in said computer database model using periodic distance intervals.

274. The method of claim 247 wherein measured signal or network properties are embedded in said computer database model using periodic time intervals.

275. The method of claim 247 wherein said embedding step embeds measured signal network properties taken while said mobile receiver or transceiver is moving throughout said facility.

276. The method of claim 247 wherein said embedding step embeds measured signal or network properties taken while said mobile receiver or transceiver is stationary at a selected location in said facility.

277. The method of claim 247 further comprising the step of defining a direction of travel of said mobile receiver or transceiver.

278. The method of claim 247 further comprising the step of defining a starting point and an ending point for said mobile receiver or transceiver.

279. The method of claim 247 further comprising the step of joining separate floor measurements collected within said facility.

280. The method of claim 247 wherein said embedded signal or network properties obtained from said embedding step are obtained in random order.

281. The method of claim 247 wherein said measurements embedded in said embedding step are obtained from a single measurement run throughout said facility.

282. The method of claim 247 wherein said measurements embedded in said embedding step are obtained from a plurality of measurement runs throughout said facility.

283. The method of claim 247 wherein said measurements embedded in said embedding step are embedded as the measurements are made.

284. A method for creating a computer database model of measured RF signal properties within a facility, comprising at least one base transceiver for transmitting or receiving RF signals, and at least one mobile receiver or transceiver for measuring the properties of said RF signals at a plurality of locations within said facility, comprising the steps of:
  representing said facility in a computer database model;
  periodically determining a location of said mobile receiver or transceiver within said facility;
  embedding said measured RF signal properties at said location within said computer database model of said facility; and
  displaying said computer database model of said facility overlayed with said embedded signals.

285. The method recited in claim 284 wherein said facility is a single building, and said periodically determining step includes the step of moving said mobile receiver or transceiver to a plurality of locations within said building.

286. The method recited in claim 284 wherein said facility comprises a plurality of buildings, and said periodically determining step comprises the step of moving said mobile receiver or transceiver to a plurality of locations within different buildings of said plurality of buildings.

287. The method recited in claim 284 wherein said representing and said displaying steps are performed in three dimensions.

288. The method recited in claim 284 wherein said periodically determining step is performed automatically.

289. A method for creating a computer database model for recorded network data throughput properties within a facility, comprising a mobile client computer for roving within a facility, and a server computer or other mobile client computer for hosting said mobile client computer, comprising the steps of:
  recording data throughput properties between said mobile client computer and said server computer or other mobile client computer at a plurality of locations within said facility,
  representing said facility in a database model;
  embedding said recorded data throughput properties at each of said plurality of locations within said database model of said facility; and
  displaying said database model of said facility overlayed with said embedded data throughput properties.

290. The method of claim 289 wherein said recording step records data throughput properties as a function of time or location within said facility.

291. The method of claim 289 wherein the facility is a single building and said recording step comprises the step of moving said mobile client computer to different locations within said building with respect to said server computer or said other mobile client computer.

292. The method of claim 289 wherein said facility comprises a plurality of buildings and said recording step comprises the step of moving said mobile client computer to different locations within different buildings of said plurality of buildings with respect to said server computer or said other mobile client computer.

293. The method of claim 289 further comprising the step of periodically determining a location of said mobile client computer within said facility.

294. The method of claim 289 wherein said representing and displaying steps are performed in three dimensions.

295. The method of claim 289 further comprising the step of moving said server computer or other mobile computer within said facility.

296. The method of claim 289 wherein said step of embedding data throughput properties comprises embedding at least one of data throughput rate, frame errors, packet retries, network data throughput, and network delay due to a fixed non-wireless portion of a network.

297. The method of claim 289 wherein said periodically determining step is performed automatically.

298. The method of claim 169 wherein said embedded signal properties obtained from said embedding step are obtained in one or more measurement runs.

299. The method of claim 134 wherein said measurements embedded in said embedding step are obtained from a plurality of measurement runs throughout said facility.

* * * * *